US009425598B2

(12) United States Patent
Yoshida et al.

(10) Patent No.: US 9,425,598 B2
(45) Date of Patent: Aug. 23, 2016

(54) SLIDING TYPE CLAMP AND CLAMP UNIT

(71) Applicant: Yazaki Corporation, Minato-ku, Tokyo (JP)

(72) Inventors: Hiroyuki Yoshida, Kosai (JP); Eiichi Tohyama, Kosai (JP); Tatsuya Oga, Kosai (JP); Shinichi Inao, Kosai (JP); Masaaki Suguro, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/452,954

(22) Filed: Aug. 6, 2014

(65) Prior Publication Data

US 2014/0346290 A1 Nov. 27, 2014

Related U.S. Application Data

(63) Continuation of application No. PCT/JP2013/054423, filed on Feb. 15, 2013.

(30) Foreign Application Priority Data

Feb. 17, 2012 (JP) ................................ 2012-032314

(51) Int. Cl.
*H02G 3/32* (2006.01)
*B60R 16/02* (2006.01)

(52) U.S. Cl.
CPC ............. *H02G 3/32* (2013.01); *B60R 16/0215* (2013.01)

(58) Field of Classification Search
CPC .................................................. B60R 16/0215
USPC ...... 248/49, 65, 70, 72, 73, 74.1, 74.2, 74.3, 248/215, 214, 316.1, 316.5, 316.6, 316.7, 248/309.1, 317, 327
See application file for complete search history.

(56) References Cited

U.S. PATENT DOCUMENTS 1,742,838 A * 1/1930 Williams ........................ 248/66
2,470,992 A * 5/1949 Kindorf et al. ................. 248/72
2,537,719 A * 1/1951 Tuepker ...................... 174/45 R
4,647,251 A * 3/1987 Gale .......................... 405/184.4
5,598,994 A 2/1997 Olewinski et al.
6,186,383 B1 * 2/2001 Kobdish ...................... 224/420
6,467,650 B1 10/2002 Lesser et al.

(Continued)

FOREIGN PATENT DOCUMENTS

CN 1144313 A 3/1997
CN 1298564 A 6/2001

(Continued)

OTHER PUBLICATIONS

International Search Report dated May 24, 2013 issued in International Application No. PCT/JP2013/054423 (PCT/ISA/210).

(Continued)

*Primary Examiner* — Nkeisha Smith

(74) *Attorney, Agent, or Firm* — Sughrue Mion, PLLC

(57) ABSTRACT

A sliding type clamp includes a clamp fixing part adapted to be fixed to a stud bolt, and a clamp body adapted to clamp an objected member. The clamp fixing part and the clamp body are integrally formed. The clamp fixing part has a first sliding structure which slides along a direction perpendicular to an axis of the stud bolt. The clamp body has a second sliding structure which slides with respect to the objected member along a longitudinal direction of the objected member.

10 Claims, 7 Drawing Sheets

P Q 34 31 26 33 25 18 28 32 35 35 38 30 16 48 R 42 43 41 36 42 27 R 48 15

(56) References Cited

U.S. PATENT DOCUMENTS

| | | | | |
|---|---|---|---|---|
| 6,631,876 | B1 * | 10/2003 | Phillips | 248/74.2 |
| 8,070,113 | B1 * | 12/2011 | Kirschner | 248/65 |
| 8,317,142 | B2 * | 11/2012 | Gallardo et al. | 248/212 |
| 8,356,778 | B2 * | 1/2013 | Birli et al. | 248/73 |
| 8,376,287 | B2 * | 2/2013 | Zhang | 248/56 |
| 8,430,365 | B2 * | 4/2013 | Benoit et al. | 248/49 |
| 8,757,562 | B2 * | 6/2014 | Fujiwara | 248/74.2 |
| 2002/0195829 | A1 | 12/2002 | Lesser et al. | |
| 2006/0130286 | A1 | 6/2006 | Igarashi et al. | |
| 2006/0144615 | A1 | 7/2006 | Girot | |
| 2008/0229550 | A1 | 9/2008 | Elsner | |
| 2008/0244874 | A1 | 10/2008 | Chiorboli | |
| 2009/0095858 | A1 * | 4/2009 | Katou et al. | 248/205.1 |
| 2009/0179115 | A1 * | 7/2009 | Shen | 248/65 |
| 2009/0250559 | A1 * | 10/2009 | Benoit et al. | 248/49 |
| 2009/0294600 | A1 * | 12/2009 | Dodge | 248/73 |
| 2010/0116947 | A1 * | 5/2010 | Winkler | 248/73 |
| 2011/0186693 | A1 * | 8/2011 | McMiles et al. | 248/65 |
| 2013/0092803 | A1 * | 4/2013 | Fujiwara | 248/74.2 |
| 2014/0061398 | A1 * | 3/2014 | Kitamura | 248/74.1 |
| 2014/0224945 | A1 * | 8/2014 | Okuhara | 248/74.1 |

FOREIGN PATENT DOCUMENTS

| | | | |
|---|---|---|---|
| CN | 1797883 | A | 7/2006 |
| CN | 1807954 | A | 7/2006 |
| CN | 1851994 | A | 10/2006 |
| CN | 101232161 | A | 7/2008 |
| CN | 101310423 | A | 11/2008 |
| FR | 2 778 280 | A1 | 11/1999 |
| JP | 06-053879 | U | 7/1994 |
| JP | 7-310721 | A | 11/1995 |
| JP | 2011-236940 | A | 11/2011 |

OTHER PUBLICATIONS

Written Opinion dated May 24, 2013 issued in International Application No. PCT/JP2013/054423 (PCT/ISA/237).

International Preliminary Report on Patentability dated Aug. 19 2014 issued by The International Bureau of World Intellectual Property Organization in counterpart International Application No. PCT/JP2013/054423.

Office Action dated Dec. 1, 2015, issued by the Japanese Patent Office in counterpart Japanese Action No. 2012-032314.

Notification of The First Office Action issued on Mar. 4, 2016 by The State Intellectual Property Office of PR China in related Application No. 201380009946.8.

* cited by examiner 1
2
3
4
5
6
7
8
9
10
11
12
13
14
15
16
17
24

9
15
16
18
19
24
25
26
27
P
Q
R

SLIDING TYPE CLAMP AND CLAMP UNIT

CROSS REFERENCE TO RELATED APPLICATIONS

This application is a continuation of PCT application No. PCT/JP2013/054423, which was filed on Feb. 15, 2013 based on Japanese Patent Application (No. JP-2012-032314) filed on Feb. 17, 2012, the contents of which are incorporated herein by reference.

BACKGROUND OF THE INVENTION

1. Field of the Invention

The present disclosure relates to a sliding type clamp and a clamp unit.

2. Description of the Related Art

When a wire harness is installed at a predetermined position of a moving object such as a vehicle, if there is a position gap between a clamp to be fixed to the wire harness and a stud bolt projected at the predetermined position, the clamp cannot be assembled to the wire harness. In this case, the wire harness cannot be installed. It is considered to use a structure disclosed, for example, in JP-A-7-310721 as a measure. That is, it is considered to use a structure which absorbs the position gap between the stud bolt and the clamp.

SUMMARY OF THE INVENTION

However, in JP-A-7-310721, because the structure only absorbs the position gap in a direction parallel to the axial direction of the wire harness, a position gap in other directions cannot be absorbed by the structure. Therefore, there is a concern that the wire harness may not be installed, and there is a problem that an influence on the workability of the wire harness may be caused.

In JP-A-7-310721, the position gap in only the one direction parallel to the axial direction of the wire harness can be absorbed due to a movement of the gap absorb structure in the one direction. Therefore, with the gap absorb structure of JP-A-7-310721, vibration or the like that is caused by, for example, run of the vehicle, cannot be effectively dispersed. Therefore, there is a concern that fatigue may be accumulated, and there is a problem that an influence on durability may be caused.

In JP-A-7-310721, because the part of the structure related to the position gap absorption has a rectangular outer shape, when the wire harness is used, for example, under the floor of the vehicle, snow and/or mud is easily attached to the structure since the vehicle splashes the snow and/or mud at the time of running. Therefore, there is a problem that some kind of trouble may occur.

In JP-A-7-310721, because the part of the gap absorbing structure is exposed to the outside and a protective member is not attached thereto, when the wire harness is installed, for example, under the floor of the vehicle, chipping easily occurs. Therefore, there is a problem that some kind of trouble may occur.

The present disclosure is made in view of the above described circumstances, and the object of the present disclosure is to provide a sliding type clamp and a clamp unit so that workability of the wire harness can be improved by absorbing the position gap, durability can be improved by dispersing vibration, and trouble due to the attachment of snow or the like can be prevented from occurring.

In order to achieve the above object, according to the present invention, there is provided a sliding type clamp comprising:

a clamp fixing part adapted to be fixed to a stud bolt; and a clamp body adapted to clamp an objected member, wherein the clamp fixing part and the clamp body are integrally formed;

wherein the clamp fixing part has a first sliding structure which slides along a direction perpendicular to an axis of the stud bolt; and wherein the clamp body has a second sliding structure which slides with respect to the objected member along a longitudinal direction of the objected member.

For example, the clamp fixing part is integrally formed on an intermediate portion of a side part of the clamp body in the longitudinal direction, and cover parts projected from both ends of the side part of the clamp body protect the clamp fixing part.

For example, the cover parts are formed into streamlined shape, and have parts whose positions are lower than a lower part of the clamp fixing part.

According to the present disclosure, there is also provided A clamp unit comprising:

the sliding type clamp according to the above which is slidably assembled to the objected member; and a fixed type clamp which is assembled to the objected member in a fixed state.

For example, the objected member is an outer member of a wire harness having a pipe shape, and a sliding regulating part for regulating a sliding movement of the sliding type clamp is provided on an outer surface of the outer member.

For example, the sliding regulating part is formed of a tape wounded on the outer surface of the outer member.

According to the present disclosure, because there are at least two sliding structures in one clamp, the position gap can be absorbed surely. Because the clamp slides relative to the member to be clamped, the clamp itself is not in a fixed state, and vibration or the like that spreads, for example, when the vehicle runs, can be effectively dispersed. That is, vibration or the like will not be focused on a point where the clamp is disposed. Therefore, according to the present disclosure, an effect that workability can be improved and an effect that durability can be improved are achieved.

According to the present disclosure, because the clamp fixing part is protected by the cover parts, an effect is achieved that trouble at the clamp fixing part can be prevented from occurring.

According to the present disclosure, snow or the like becomes hard to be attached due to the streamlined cover parts, and the clamp fixing part is not protruded from below due to the cover parts that have parts whose positions are lower than the lower part of the clamp fixing part. Therefore, effects are achieved that trouble at the clamp fixing part can be prevented from occurring and trouble at the peripheral part of the clamp fixing part can be prevented from occurring.

According to the present disclosure, the structure for assembling the member to be clamped includes the sliding type clamp which has at least two sliding structures and a fixed type clamp which is assembled to the member to be clamped in a fixed state. Because the position gap is absorbed surely with the sliding type clamp, an effect is achieved that workability can be improved. Because the sliding type clamp is included, effects are achieved that vibration or the like that spreads, for example, when the vehicle runs, can be dispersed effectively, and that durability can be improved.

According to the present disclosure, because the sliding regulating part is provided to the outer member while the objected member to be clamped is the pipe body which becomes the outer member of the wire harness, an effect is achieved that the sliding quantity of the sliding type clamp can be regulated in accordance with the installation of the wire harness.

According to the present disclosure, an effect is achieved that the sliding quantity of the sliding type clamp can be regulated with a simple structure.

DETAILED DESCRIPTION OF THE EXEMPLARY EMBODIMENTS

There is a sliding type clamp having at least two sliding structures. When a wire harness is installed, the sliding type clamp is slidably assembled to an outer member with a pipe shape of the wire harness to absorb a position gap between the sliding type clamp and the wire harness or a stud bolt surely.

Figure 1A:
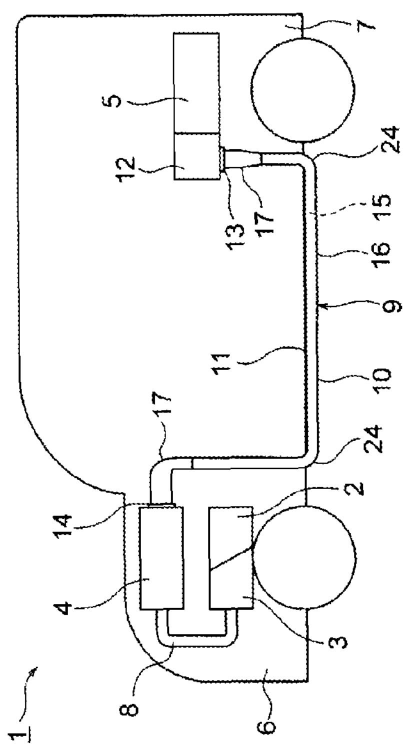
FIG. 1A is a view illustrating a state that a wire harness is installed in a vehicle.
Figure 1B:
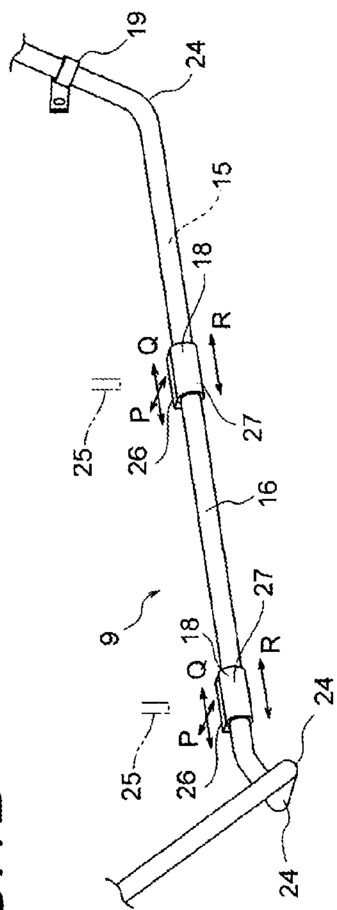
FIG. 1B is a view illustrating an assembling structure including sliding type clamps.
Figure 2A:
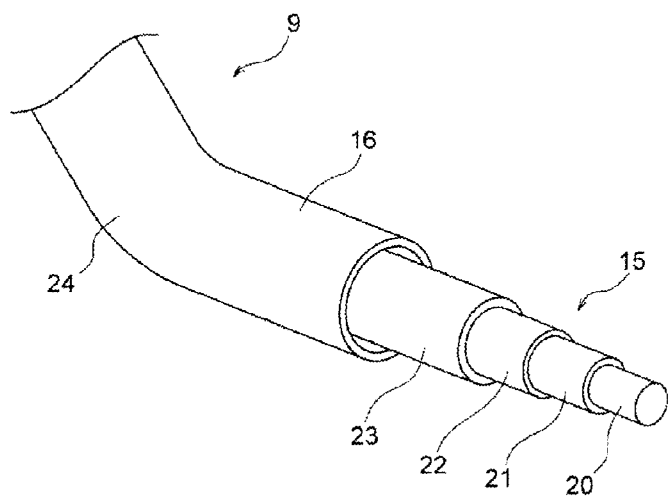
FIG. 2A is a perspective view illustrating a high voltage coaxial combined conductive path of the wire harness.
Figure 2B:
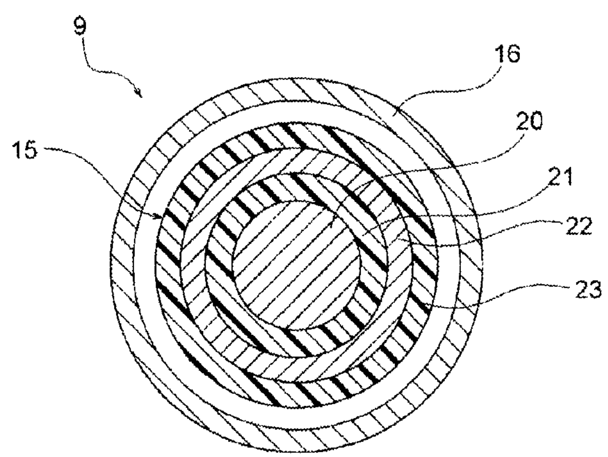
FIG. 2B is a sectional view illustrating the high voltage coaxial combined conductive path.

Below, an embodiment will be described with reference to the figures. FIGS. 1A and 1B illustrate sliding type clamps and a structure for assembling a member to be clamped of the present disclosure. FIG. 1A is a view illustrating a state that a wire harness is installed in a vehicle, and FIG. 1B is a view illustrating an assembling structure including sliding type clamps. FIGS. 2A and 2B are views illustrating a high voltage coaxial combined conductive path of the wire harness. FIGS. 3 to 7C are a front view, a top view, and perspective views of the sliding type clamp and its components.

In the embodiment, the present disclosure is applied to a wire harness which is installed in a hybrid vehicle (or an electric vehicle or a regular vehicle).

In FIG. 1A, a reference number 1 indicates a hybrid vehicle. The hybrid vehicle 1 is a vehicle which is driven by a combination of two powers of an engine 2 and a motor unit 3, and the electric power from a battery 5 (battery pack) will be supplied to the motor unit 3 via an inverter unit 4. The engine 2, the motor unit 3 and the inverter unit 4 are arranged in an engine room 6 at the position of front wheels and the like in the embodiment. The battery 5 is arranged in a vehicle rear part 7 of rear wheels and the like (the battery 5 may be arranged in an indoor space behind the engine room 6).

The motor unit 3 and the inverter unit 4 are connected by a high voltage wire harness 8. The battery 5 and the inverter unit 4 are also connected by a high voltage wire harness 9. A middle part 10 of the wire harness 9 is installed at the ground side of a vehicle body floor 11. The wire harness 9 is installed substantially in parallel with the vehicle body floor 11. The vehicle body floor 11 is a well-known body and is a so-called panel member, and through holes (whose reference numbers are omitted.) are formed at predetermined positions in the panel member. The wire harness 9 is inserted through these through holes.

The wire harness 9 and the battery 5 are connected through a junction block 12 provided on the battery 5. A back end 13 of the wire harness 9 is electrically connected to the junction block 12 by a well-known method. A front end 14 of the wire harness 9 is electrically connected to the inverter unit 4 by a well-known method.

The motor unit 3 includes a motor and a generator. The inverter unit 4 includes an inverter and a converter. The motor unit 3 is formed as a motor assembly including a shielding case. The inverter unit 4 is formed as an inverter assembly including a shielding case. The battery 5 is a Ni-MH battery or Li-ion battery, and is modularized. An electricity charging device such as a capacitor may be used. The battery 5 is not particularly limited as long as the battery 5 may be used for the hybrid vehicle 1 or an electric vehicle.

First, the construction and structure of the wire harness 9 are described. The wire harness 9 is a high voltage member used to electrically connect the inverter unit 4 to the battery 5 described as above, and includes high voltage coaxial combined conductive paths 15 (refer to FIGS. 2A and 2B), an outer member 16 (an objected member or a corrugated tube to be clamped) and electromagnetic shielding members 17. The wire harness 9 of such a construction is assembled and fixed to the vehicle body floor 11 through a plurality of sliding type clamps 18 according to the present disclosure and/or a fixed type clamp 19.

In the embodiment, when the outer member 16 has a shielding function, the electromagnetic shielding members 17 are formed to be connected to the two terminals of the outer member 16, and when the outer member 16 does not have a shielding function, the electromagnetic shielding members 17 are formed to extend from the inverter unit 4 to the battery 5. When the outer member 16 does not have a shielding function, the electromagnetic shielding members 17 intervenes between the high voltage coaxial combined conductive path 15 and the outer member 16. A shielding member including well-known braid or metal foil is adopted as the electromagnetic shielding member 17. The electromagnetic shielding members 17 are connected to shielding cases of the motor unit 3 and the inverter unit 4, for example through shield shells not shown in the figure, or through connectors not shown in the figure.

In FIGS. 2A and 2B, one high voltage coaxial combined conductive path 15 has a positive circuit and a negative circuit. That is, there are two systems of circuits. In particular, a first conductive path 20 which has a circular cross section and is located in the center of the high voltage coaxial combined conductive path 15, a first insulator 21 which covers the circumference of the first conductive path 20 with a predetermined thickness, a second conductive path 22 which is provided outside the first insulator 21, and a second insulator 23 which covers the circumference of the second conductive path 22 with a predetermined thickness are included.

The high voltage coaxial combined conductive path 15 is not limited to the two systems of circuits. Three systems of circuits (three circuits), four systems of circuits (four circuits), . . . , n systems of circuits (n circuits) are also possible as long as these circuits are coaxial in one construction. In addition, the well-known high voltage electric wire (high voltage conductive path) including a conductor and an insulator may be used. Further, a high voltage conductive path in which an insulator is provided to a bus bar or a web bus bar, and a well-known cab tire cable may be used.

The outer member 16 has a pipe body made of metal, namely, a metal pipe body, and is formed to have a length necessary to accommodate the high voltage coaxial combined conductive path 15. The outer member 16 is not limited to a metal pipe body, but may be a pipe body made of resin or elastomer. A corrugated tube is preferably used as the pipe body made of resin. The outer member 16 is formed to have a circular cross section in the embodiment. The cross section is just an example. As long as the sliding type clamp 18 to be described below may slide, the cross section may be oval, ellipse, or rectangular shape. The outer member 16 is bent in accordance with the wiring course. A reference number 24 indicates a bent part.

In the embodiment, an aluminum pipe of a circular cross section (as an example) is used as the outer member 16. The outer member 16 is formed to have such an inside diameter that the high voltage coaxial combined conductive path 15 is accommodated. The outer member 16 is formed to have such a thickness that a protective function can be effective.

Figure 3:
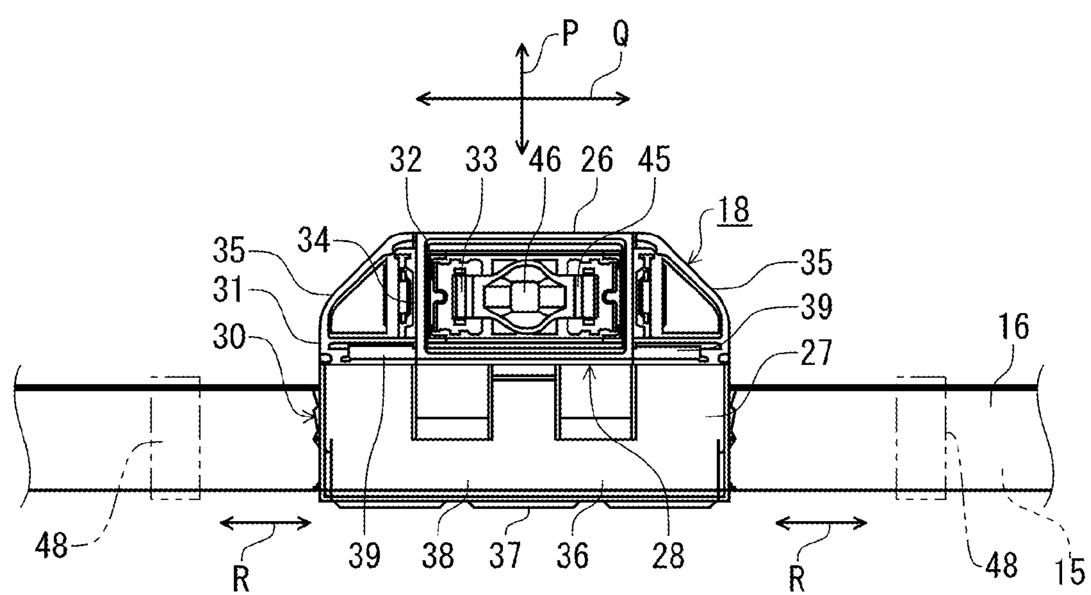
FIG. 3 is a front view illustrating the sliding type clamp.
Figure 4:
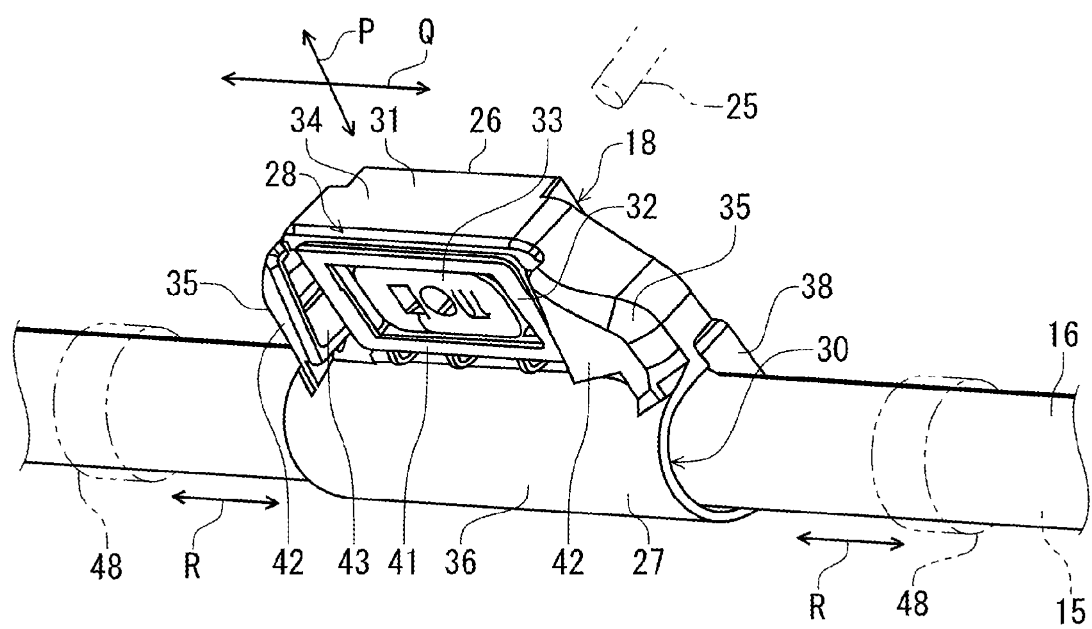
FIG. 4 is a rear perspective view illustrating the sliding type clamp.

In FIGS. 1B, 3 and 4, the sliding type clamp 18 is a member used to install the wire harness 9, and is slidably assembled to a predetermined position of the outer member 16. The sliding type clamp 18 has two sliding structures (to be described below), and the sliding type clamp 18 is formed so that the range, in which the sliding type clamp 18 can be assembled to the stud bolt 25, is larger than the prior one. The sliding type clamp 18 is formed so that a position gap from the stud bolt 25 is absorbed by the two sliding structures, and the wire harness 8 can be installed surely.

The sliding type clamp 18 is configured to include a clamp fixing part 26 which functions as a part corresponding to the stud bolt 25 which becomes a fixed point, and a clamp body 27 which functions as a part corresponding to the outer member 16, and the clamp fixing part 26 and the clamp body 27 are integrally formed.

The clamp fixing part 26 has a first sliding structure 28 which slides along a first direction P perpendicular to an axis direction of the stud bolt 25. The clamp body 27 has a second sliding structure 30 which slides on the outer member 16 along a longitudinal direction R of the outer member 16. A sliding structure which slides along a second direction Q perpendicular to both of the axis direction of the stud bolt 25 and the first direction P may be added to the clamp fixing part 26.

The sliding type clamp 18 is a resin product and includes a plurality of components. In particular, the sliding type clamp 18 includes a clamp base 31 made of resin, a clamp seat 32 made of resin and a stud clamp 33 made of resin. The clamp base 31 has a fixing part base 34 which constructs the clamp fixing part 26, a pair of cover parts 35 which are disposed at both sides of the fixing part base 34, and the clamp body 27. The sliding type clamp 18 is completed after steps of, for example, assembling the stud clamp 33 to the clamp seat 32 and then assembling the stud clamp 33 and the clamp seat 32 to the fixing part base 34 of the clamp base 31 are performed.

The sliding type clamp 18 is made of resin as described above, but the sliding type clamp 18 is not limited to the resin material. Because the sliding type clamp 18 is made of resin, there is an advantage that the sliding type clamp 18 can be colored in accordance with the outer member 16 or the assembled portion or in accordance with the form of the wire harness 9.

Regarding the sliding structures in the clamp fixing part 26, the first sliding structure 28 is formed into such a structure that the clamp seat 32 slides (moves) along the first direction P relative to the fixing part base 34.

Figure 5:
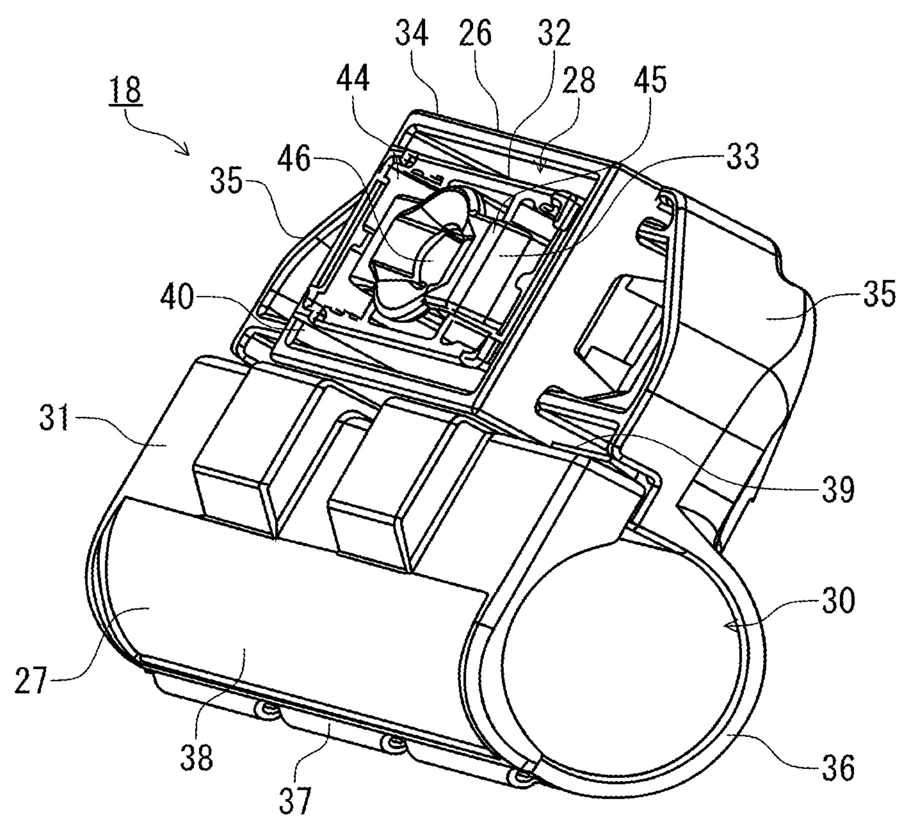
FIG. 5 is a front perspective view illustrating the sliding type clamp.

In FIG. 5, the clamp body 27 has a lower body part 36, a hinge 37, an upper body part 38 and a pair of locking parts 39, and is formed into a generally cylindrical shape. Because the clamp body 27 has the second sliding structure 30 which slides on the outer member 16 along the longitudinal direction R of the outer member 16 as illustrated in FIGS. 1B, 3 and 4, the clamp body 27 has a diameter which is slightly larger than the outer diameter of the outer member 16 to have the second sliding structure 30. Because the clamp body 27 is made of resin, the clamp body 27 slides on the outer member 16 smoothly.

The fixing part base 34 is integrally formed on the center of the side part of the clamp body 27. The fixing part base 34 is formed into such a rectangular frame shape into which the clamp seat 32 can be accommodated. A reference number 40 (refer to FIG. 7C) in the fixing part base 34 indicates an accommodating space, and the clamp seat 32 is slidably accommodated in the accommodating space 40. The fixing part base 34 is protected by the pair of cover parts 35 projecting from two ends of the side part of the clamp body 27.

Figure 6:
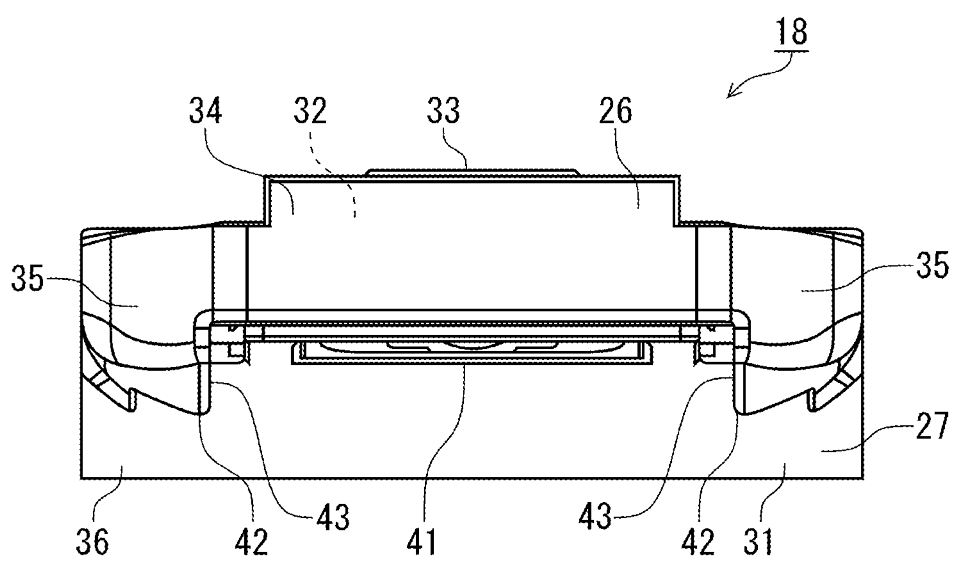
FIG. 6 is a top view of the sliding type clamp.
Figure 7A:
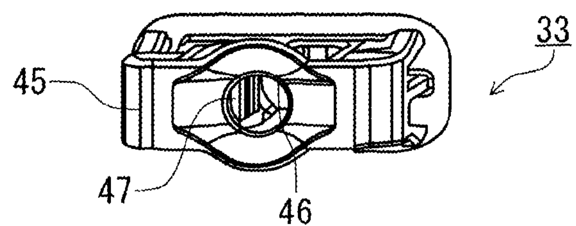
FIG. 7A is a perspective view illustrating a stud clamp of the sliding type clamp.
Figure 7B:
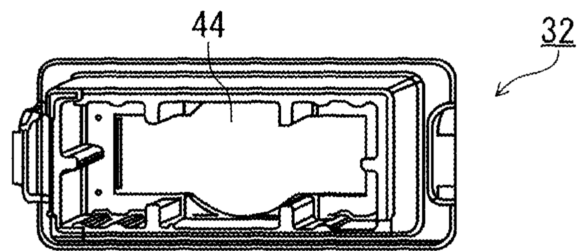
FIG. 7B is a perspective view illustrating a clamp seat of the sliding type clamp.
Figure 7C:
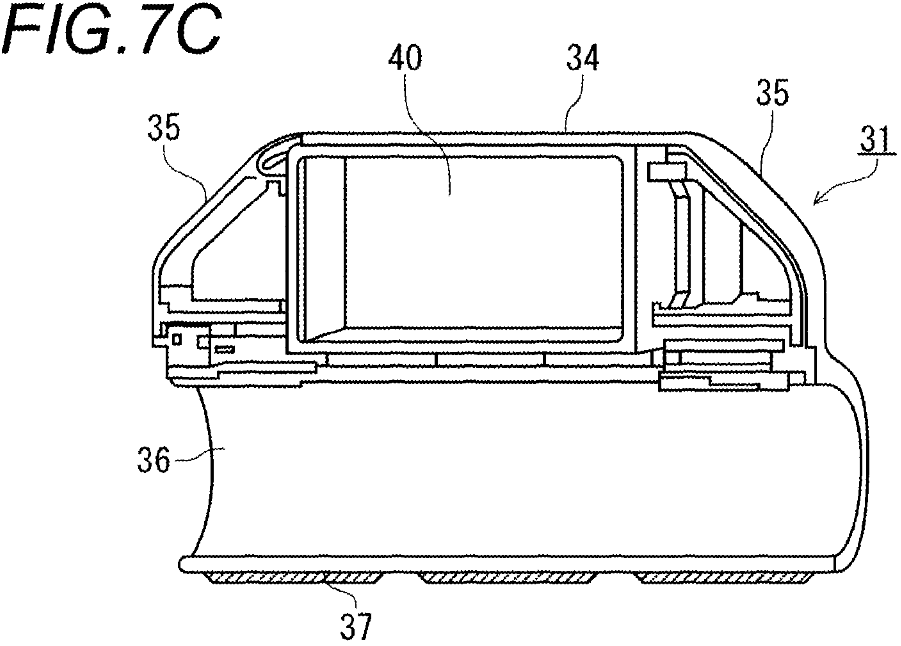
FIG. 7C is a perspective view illustrating a clamp base of the sliding type clamp.

The pair of cover parts 35 are formed into a streamlined shape, and are formed into a shape that has a part (lowest part 42) whose position is lower than a lower part 41 of the clamp fixing part 26 as shown in FIG. 6. Since the pair of cover parts 35 have a rounded streamlined shape, while snow or the like becomes hard to be attached, a force from the outside can be easily drained. Because there are steps 43 from the clamp fixing part 26 since the pair of cover parts 35 have the lowest parts 42, it is possible that the clamp fixing part 26 is not protruded, and chipping can be prevented. The pair of cover parts 35 are formed as parts which effectively prevents trouble.

In FIGS. 5 and 7A to 7C, the clamp seat 32 is formed into a rectangular box shape. The stud clamp 33 is accommodated in an accommodating space 44 of the rectangular box shape.

The stud clamp 33 is a part which is fixed to the stud bolt 25 (refer to FIG. 1B), and has a rectangular clamp body 45. The clamp body 45 has a bolt insertion hole 46 which becomes a part into which the stud bolt 25 is inserted. A plurality of flexible bolt locking parts 47 are formed and arranged at inside positions of the bolt insertion hole 46.

Because the sliding type clamp 18 has the first sliding structure 28 and second sliding structure 30, by sliding (moving) with these structures, a position gap from the stud bolt 25 to the sliding type clamp 18 can be absorbed surely. Because the sliding type clamp 18 has the second sliding structure which slides relative to the outer member 16, the sliding type clamp 18 itself is not in a fixed state, and vibration or the like that spreads, for example, when the vehicle runs, can be effectively dispersed. That is, the sliding type clamp 18 is a clamp that will not make vibration or the like focus on a point where the sliding type clamp 18 is disposed.

Therefore, according to the sliding type clamp 18, an effect that operativity can be improved and an effect that durability can be improved are achieved.

Returning back to FIG. 1B, the fixed type clamp 19 is assembled to the outer member 16 in a fixed state, and a well-known clamp is used here.

When the plurality of sliding type clamps 18 are assembled and fixed to the stud bolts 25 while the position gaps are absorbed, and then by moving the outer member 16 so that the outer member 16 slides relative to the plurality of sliding type clamps 18 to assemble and fix the fixed type clamp 19 to a predetermined position, the wiring of the wire harness 9 is completed.

By providing sliding regulating parts 48 (refer to FIGS. 3 and 4) on the outer surface of the outer member 16, the sliding quantity of the sliding type clamp 18 can be regulated in accordance with the wiring of the wire harness 8. When the sliding regulating part 48 is formed of, for example, a tape roll, the sliding regulating part 48 can be cheap and have a simple structure. As long as the sliding quantity can be regulated, the sliding regulating part 48 is not limited to the tape roll.

It is apparent that various modifications can be made to the invention without changing the purpose of the invention.

The sliding type clamp having two sliding structures can achieve an absorbing of the position gap surely, and vibration or the like that spreads, for example, when the vehicle runs, can be effectively dispersed.

What is claimed is:

1. A sliding type clamp comprising:

a clamp fixing part fixed to a stud bolt; and a clamp body clamped to an objected member, wherein the clamp fixing part and the clamp body are integral with each other;

wherein the clamp fixing part has a first sliding structure which slides along a direction perpendicular to an axis of the stud bolt; and wherein the clamp body has a second sliding structure which allows the clamp body to continuously slide with respect to the objected member along a longitudinal direction of the objected member in a final assembled configuration.

2. The sliding type clamp according to claim 1, wherein the clamp fixing part is integrally formed on an intermediate portion of a side part of the clamp body in the longitudinal direction; and wherein cover parts projected from both ends of the side part of the clamp body protect the clamp fixing part.

3. The sliding type clamp according to claim 2, wherein the cover parts are formed into streamlined shape, and have parts whose positions are lower than a lower part of the clamp fixing part.

4. The sliding type clamp according to claim 1, wherein the first sliding structure includes a fixing part base and a clamp seat which moves along a direction perpendicular to an axis of insertion of the stud bolt with respect to the fixing part base; and wherein the clamp seat has a stud clamp which fixes the stud bolt.

5. The sliding type clamp according to claim 4, wherein the clamp seat has an accommodating space; and wherein the stud clamp is accommodated in the accommodating space of the clamp seat.

6. The sliding type clamp according to claim 1, wherein the first sliding structure comprises:

a fixing part base, and a clamp seat which is received in an accommodating space so as to be movable to approach or separate from the clamp body along a direction perpendicular to an axis of insertion of the stud bolt with respect to the fixing part base, wherein the clamp seat comprises a stud clamp which fixes the stud bolt.

7. The sliding type clamp according to claim 1, wherein the clamp fixing part is immovably fixed to the stud bolt.

8. A clamp unit comprising:

the sliding type clamp according to claim 1 which is slidably assembled to the objected member; and a fixed type clamp which is assembled to the objected member in a fixed state.

9. The clamp unit according to claim 8, wherein the objected member is an outer member of a wire harness having a pipe shape; and wherein a sliding regulating part for regulating a sliding movement of the sliding type clamp is provided on an outer surface of the outer member.

10. The clamp unit according to claim 9, wherein the sliding regulating part is formed of a tape wounded on the outer surface of the outer member.

* * * * *